US008718187B2

(12) United States Patent
Wang

(10) Patent No.: US 8,718,187 B2
(45) Date of Patent: May 6, 2014

(54) METHODS AND APPARATUSES FOR IN-PHASE AND QUADRATURE-PHASE IMBALANCE COMPENSATION

(75) Inventor: Robert C. Wang, Mendham Township, NJ (US)

(73) Assignee: Alcatel Lucent, Paris (FR)

( * ) Notice: Subject to any disclaimer, the term of this patent is extended or adjusted under 35 U.S.C. 154(b) by 352 days.

(21) Appl. No.: 13/106,312

(22) Filed: May 12, 2011

(65) Prior Publication Data

US 2012/0288026 A1 Nov. 15, 2012

(51) Int. Cl.
*H04B 15/00* (2006.01)

(52) U.S. Cl.
USPC .......................................................... 375/296

(58) Field of Classification Search
USPC .......................................... 375/296, 349, 371
See application file for complete search history.

(56) References Cited

U.S. PATENT DOCUMENTS 8,280,314 B2 * 10/2012 Heutmaker et al. ............ 455/73

OTHER PUBLICATIONS

"Rotation Matrix" http://mathworld.wolfram.com/RotationMatrix.html May 2011.

Lei Ding et al., "Compensation for Frequency Dependent Modulator Imbalance in Predistortion Linearization Systems" Lucent Technologies, May 7, 2003, whole document.

* cited by examiner

*Primary Examiner* — Kevin Kim
(74) *Attorney, Agent, or Firm* — Harness, Dickey & Pierce

(57) ABSTRACT

At least one example embodiments discloses a method of compensating for in-phase and quadrature (IQ) imbalance in a base station. The method includes generating, at the base station, compensation filter weights based on a plurality of IQ imbalanced training signals, the generating including, determining the compensation filter weights based on the plurality of imbalanced training signals in a frequency domain. The method further includes filtering based on the compensation filter weights.

12 Claims, 10 Drawing Sheets

20
84
86a
88a
90a
92
83a
Lowpass Filter
OpAmp
ADC
I Samples
RF Signal
LO
IQ Compensation
86b
88b
90b
Lowpass Filter
OpAmp
ADC
Q Samples
83b
Tone Generator
40

METHODS AND APPARATUSES FOR IN-PHASE AND QUADRATURE-PHASE IMBALANCE COMPENSATION

BACKGROUND

In transmitters and receivers, in-phase (I) and quadrature-phase (Q) phase signals become imbalanced due to analog circuits within a transmitter or receiver. For example, analog circuits may include demodulators, low pass filters and operational amplifiers. An analog circuit in a receiving path may have a zero intermediate frequency (IF) design that produces imbalanced I and Q signals.

IQ imbalance may be caused by a phase offset in demodulator cosine and sine signals, a gain difference between an I-path and a Q-path in the low pass filters and operational amplifiers, and a path length (delay) difference between the I-path and Q-path.

For example, quadrature carriers in an analog modulator do not have exactly the same amplitudes and an exact phase difference of 90 degrees. This causes cross-talk between the I and Q paths, which is referred to as IQ imbalance.

The nature of the IQ imbalance is that an amount of the I signal spills into the Q signal and an amount of the Q signal spells into the I signal. The frequency response of the IQ imbalanced signal has not only the original signal but also an image, at the negative frequency. For example, a 5 MHz tone has an image signal at −5 MHz, with lower amplitude. A wideband signal has a wideband image with negative frequencies. If the frequency band of the wideband signal overlaps with its image, the wideband signal and images are superimposed in the overlapped frequencies.

SUMMARY

According to at least one example embodiment, IQ imbalance is corrected by digital filters using an algorithm according to at least one example embodiment to estimate weights of the digital filters.

The algorithm determines a set of filter weights (and length) to reduce (cancel) the IQ imbalanced images. The algorithm uses a frequency-domain least-squares fit method. Tone signals are sampled and input to an analog circuit of a demodulator or modulator and, thus, the outputted tone signals are imbalanced. Outputted tone samples for each IQ imbalanced tone signal, at different frequencies, are captured. The algorithm determines the DFTs (Discrete Fourier Transform) of each sampled tone signal. The filter weights are adjusted to reproduce the tone and to eliminate the image (target value of 0). The filter weights are determined based on a least-squares fit on the DFT values (frequency-domain values) of the imbalanced sampled tones.

At least one example embodiment discloses a method of compensating for in-phase and quadrature (IQ) imbalance in a base station. The method includes generating, at the base station, compensation filter weights based on a plurality of IQ unbalanced training signals, the generating including, determining the compensation filter weights based on the plurality of imbalanced training signals in a frequency domain. The method further includes filtering based on the compensation filter weights.

At least another example embodiment discloses a base station configured to generate compensation filter weights based on an plurality of IQ imbalanced training signals. The generating includes determining the compensation filter weights based on the plurality of imbalanced training signals in a frequency domain.

At least another example embodiment discloses a user equipment (UE) configured to receive a compensated signal from a base station, the signal being compensated based on an plurality of IQ imbalanced training signals and compensation filter weights based on the plurality of unbalanced training signals in a frequency domain.

BRIEF DESCRIPTION OF THE DRAWINGS

Example embodiments will be more clearly understood from the following detailed description taken in conjunction with the accompanying drawings. FIGS. 1-4B represent non-limiting, example embodiments as described herein.

FIG. 3 illustrates an IQ imbalance and compensation model according to at least one example embodiment; and FIGS. 4A-4B illustrate a IQ compensation model according to at least one example embodiment.

Figure 1A:
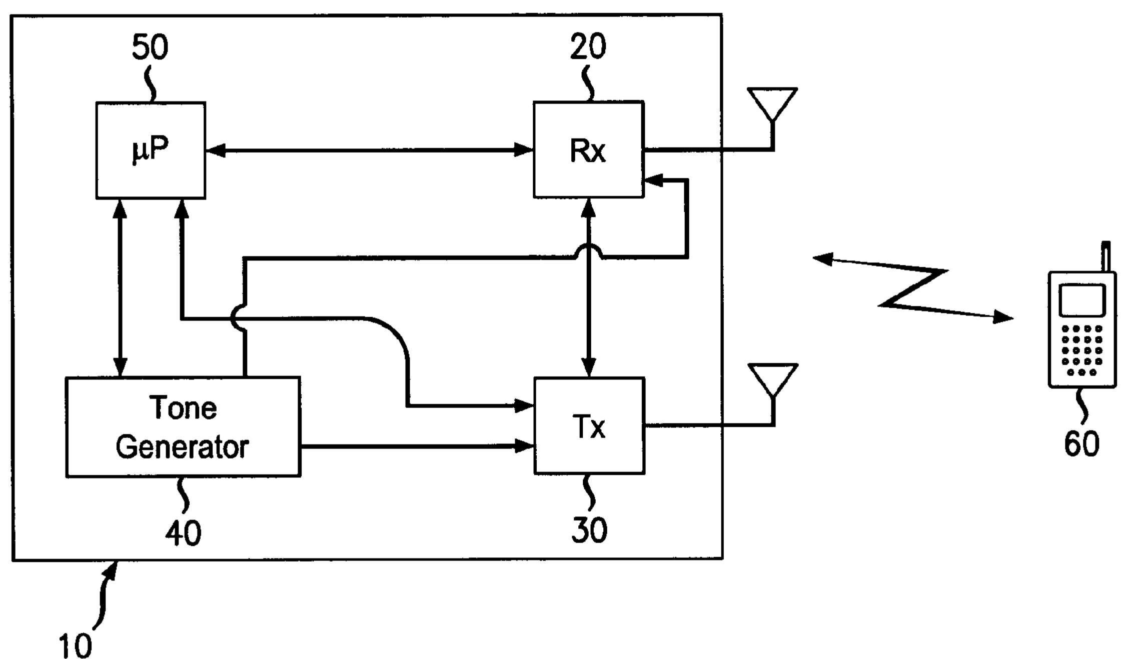
FIGS. 1A-1C illustrate a base station according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of regions and/or structural elements may be reduced or exaggerated for clarity. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all turns (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes (e.g., a scheduler located at a cell site, base station or Node B). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

As used herein, the term "user equipment" (UE) may be synonymous to a mobile user, mobile station, mobile terminal, user, subscriber, wireless terminal and/or remote station and may describe a remote user of wireless resources in a wireless communication network. The term "base station" may be understood as a one or more cell sites, base stations, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example.

The algorithm determines a set of filter weights (and length) to reduce (cancel) the IQ imbalanced images. The algorithm uses a frequency-domain least-squares fit method. Tone signals are sampled and input to an analog circuit of a demodulator or modulator and, thus, the outputted tone signals are imbalanced. Outputted tone samples for each tone signal, at different frequencies, are captured. The algorithm determines the DFTs (Discrete Fourier Transform) of each sampled tone signal. The filter weights are adjusted to reproduce the tone and to eliminate the image (target value of 0). The filter weights are determined based on a least-squares fit on the DFT values (frequency-domain values) of the imbalanced sampled tones.

Figure 1B:
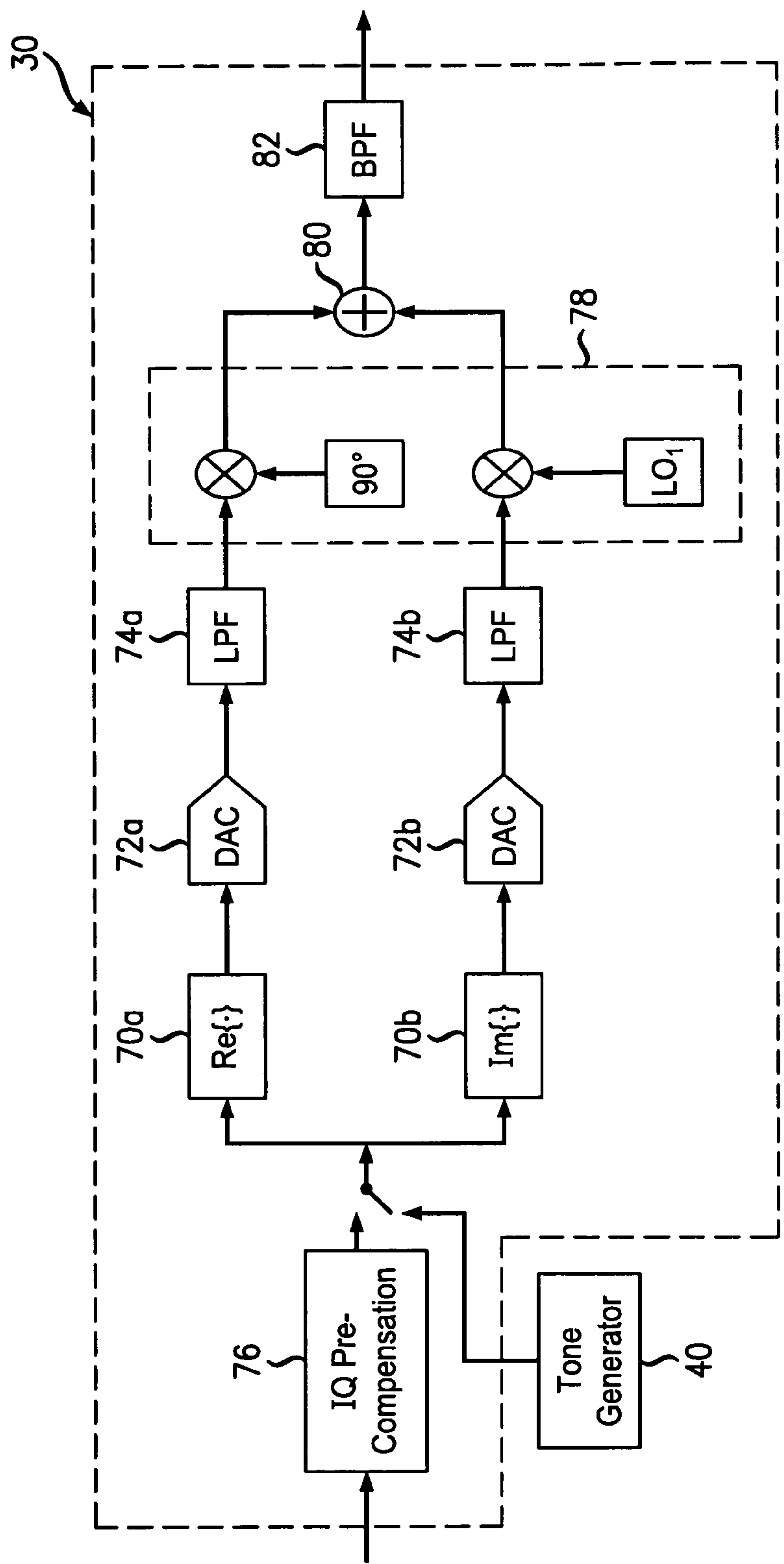
Figure 1C:
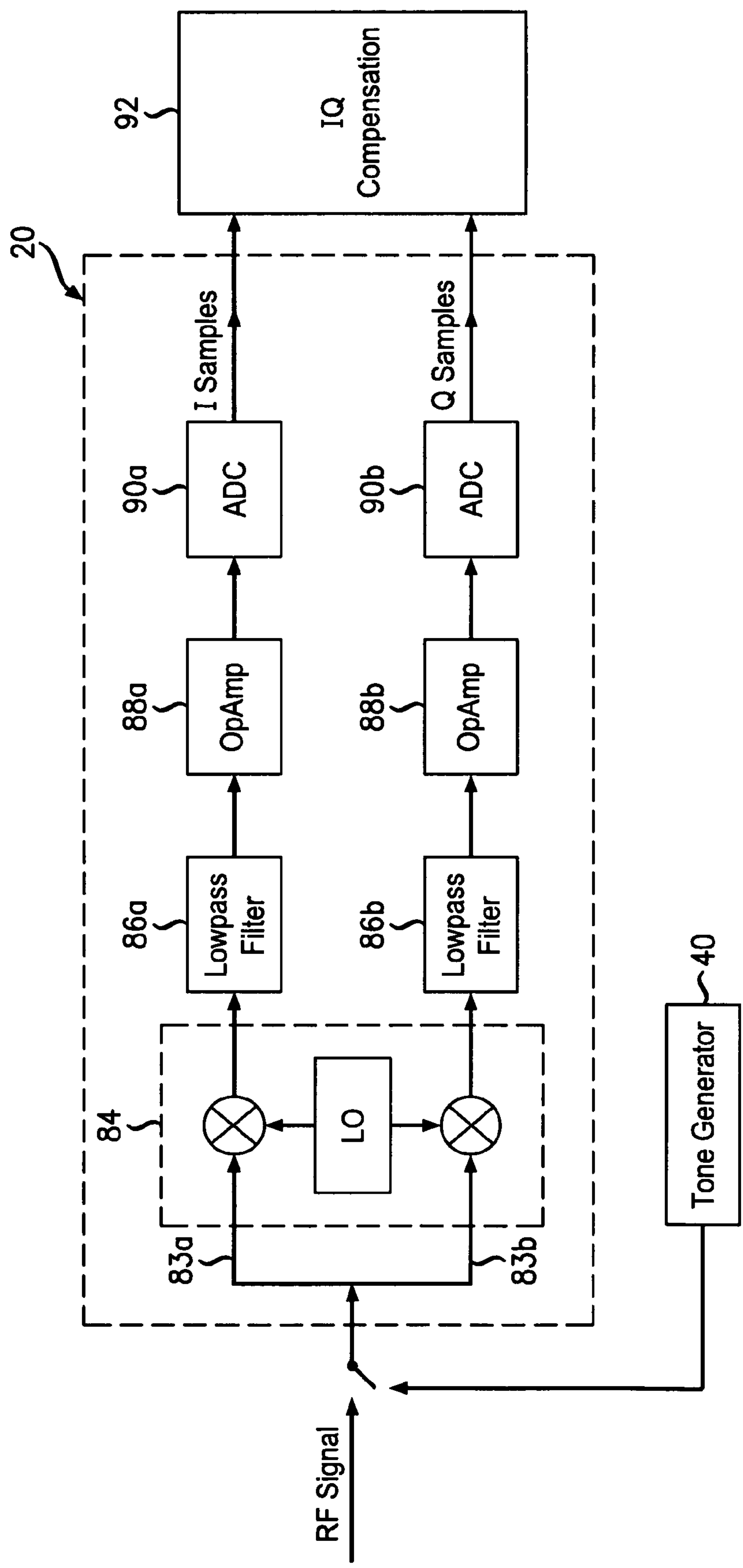

FIGS. 1A-1C illustrate a base station according to at least one example embodiment. FIG. 1A illustrates a base station 10 including a receiver 20, a transmitter 30, a tone generator 40 and a microprocessor 50. It should be understood that the receiver 20 and the transmitter 30 may be a transceiver. However, for the sake of clarity they are illustrated as separate elements.

As should be understood, the base station 10 is configured to communicate with a user equipment (UE) 60. The receiver 20 is configured to receive signals and the transmitter is configured to transmit signals. The tone generator 40 is configured to generate tones of various frequencies as training signals for the receiver 20 and the transmitter 30. The microprocessor 50 is a controller for the base station 50. It should be understood that the base station 10 may include additional features and should not be limited to those shown in FIG. 1A.

FIG. 1B illustrates an example embodiment of the transmitter shown in FIG. 1A.

As shown in FIG. 1B, the transmitter includes a direct-path 70*a* and an image-path 70*b*. The paths 70*a*, 70*b* includes digital-to-analog converters (DACs) 72*a*, 72*b* and low pass filters (LPFs) 74*a*, 74*b* and a modulator 78. An IQ pre-compensation system 76 pre-compensates an input signal for IQ imbalance. At least one example embodiment of IQ compensation is described below with reference to FIGS. 3-4B. Thus, for the sake of brevity, the IQ pre-compensation system 76 will not be described in greater detail. However, it should be understood that the at least one example embodiment of FIGS. 3-4B may be user to determine the pre-compensation systems 76*a*, 76*b*.

An input signal to be transmitted includes in-phase (real) signal and an image signal. As shown, both the real signal and image signal are subject to the IQ pre-compensation system 76 and then pre-transmission processing through the DACs 72*a*, 72*b*, LPFs 74*a*, 74*b* and the modulator 78. A signal output from the modulator 78 on the direct-path 70*a* is added to a signal output from the modulator 78 on the image-path 70*b* at an adder 80. The added signal output is input to a band pass filter (BPF) 82. The BPF 82 filters the added signal output.

The tone generator 40 is configured to generate tones of various frequencies as training signals for the transmitter 30.

FIG. 1C illustrates an example embodiment of the receiver shown in FIG. 1A. As shown, the receiver is configured to receive a radio frequency (RF) signal. The tone generator 40 is configured to generate tones of various frequencies as training signals for the receiver 20.

The receiver 20 includes a direct-path 83*a* and an image-path 83*b*. Each path 83*a*, 83*b* includes a LPF 86*a*, 86*b*, an operational amplifier 88*a*, 88*b* and an analog-to-digital converter (ADC) 90*a*, 90*b*. A real signal of the received signal is processed on the direct-path 83*a* and an image signal of the received signal is processed on the image-path 83*b*. The ADC 90*a* outputs in-phase samples of the received signal to an IQ compensator 92 and the ADC 90*b* outputs image samples (quadrature samples) to the IQ compensator 92.

Figure 3:
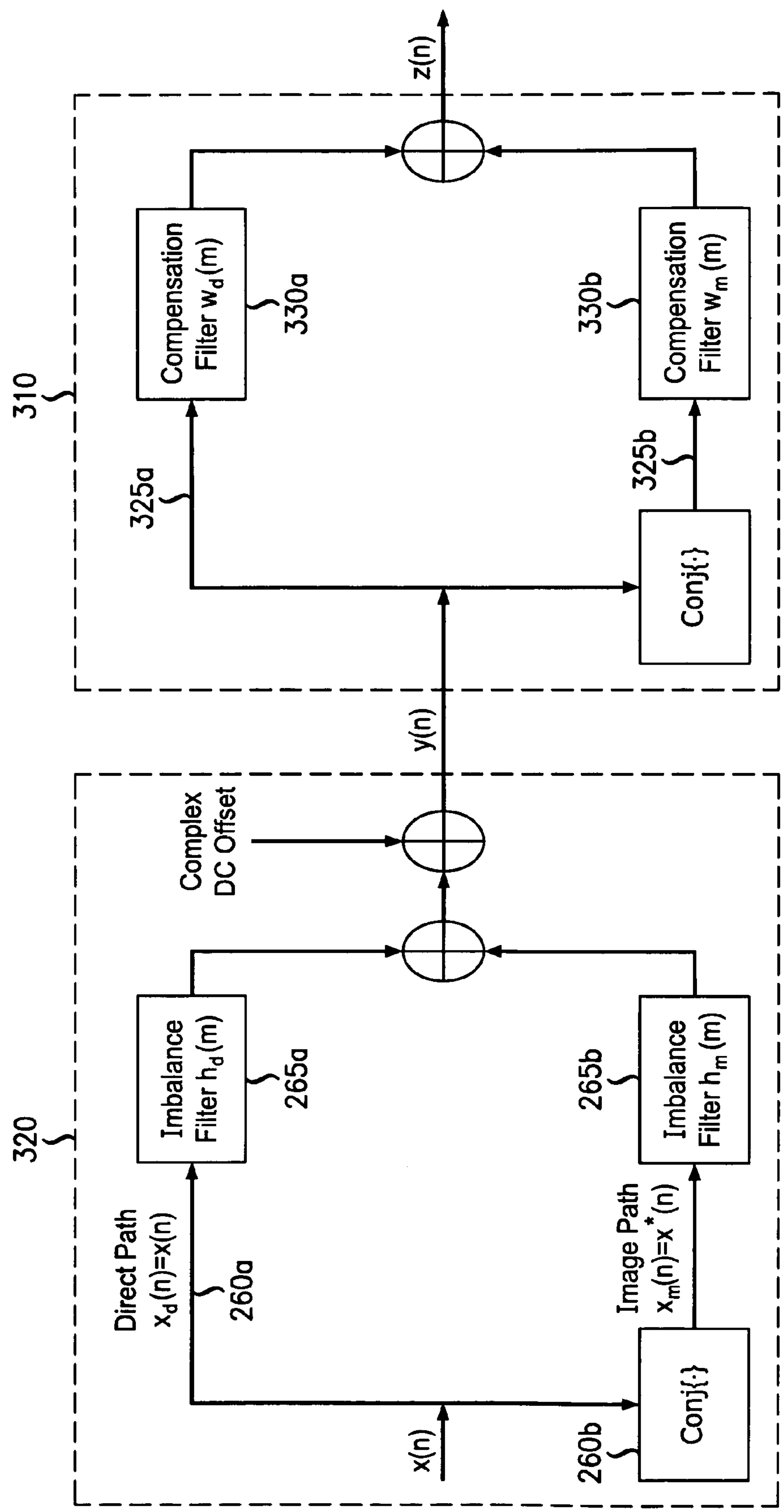
Figure 4A:
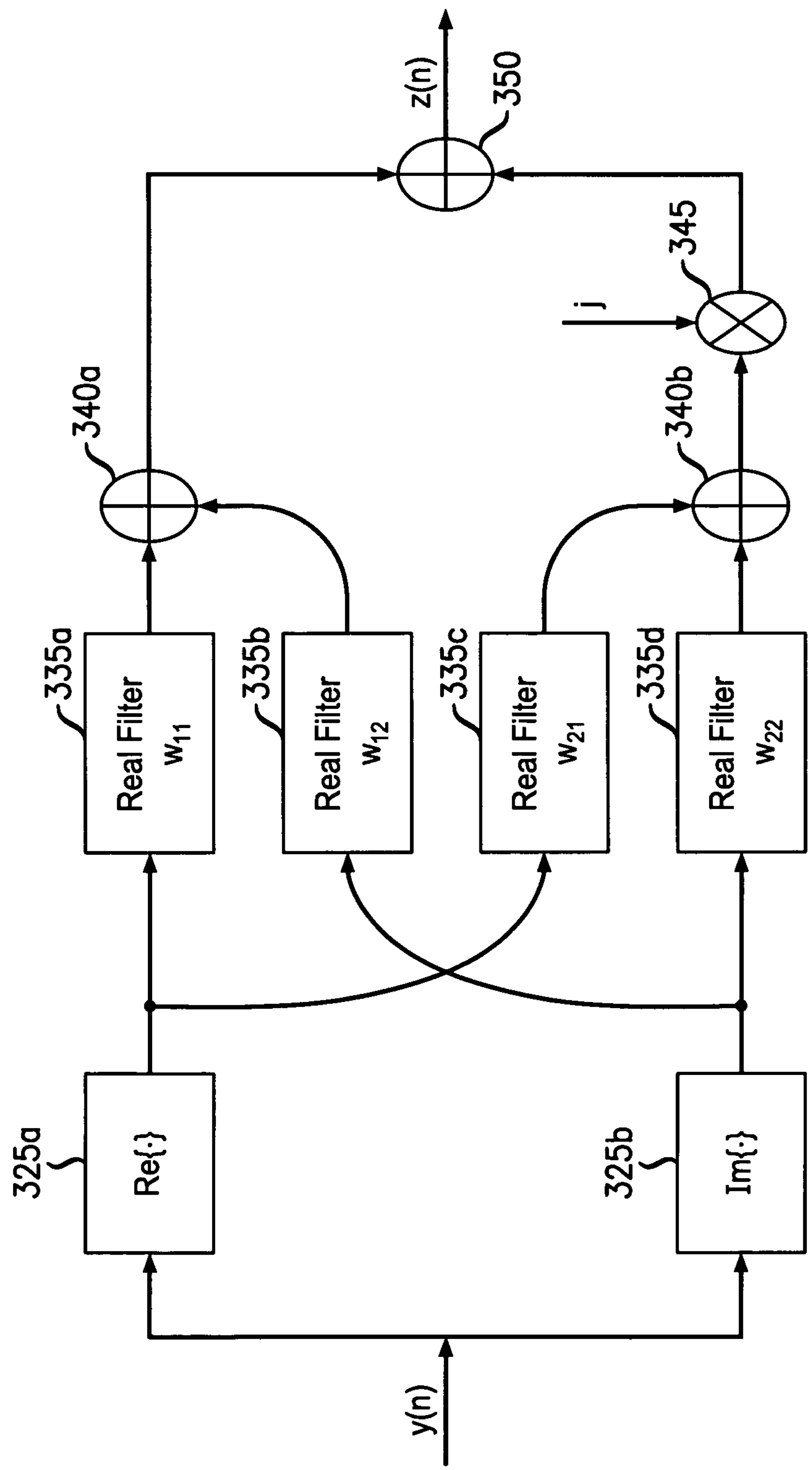
Figure 4B:
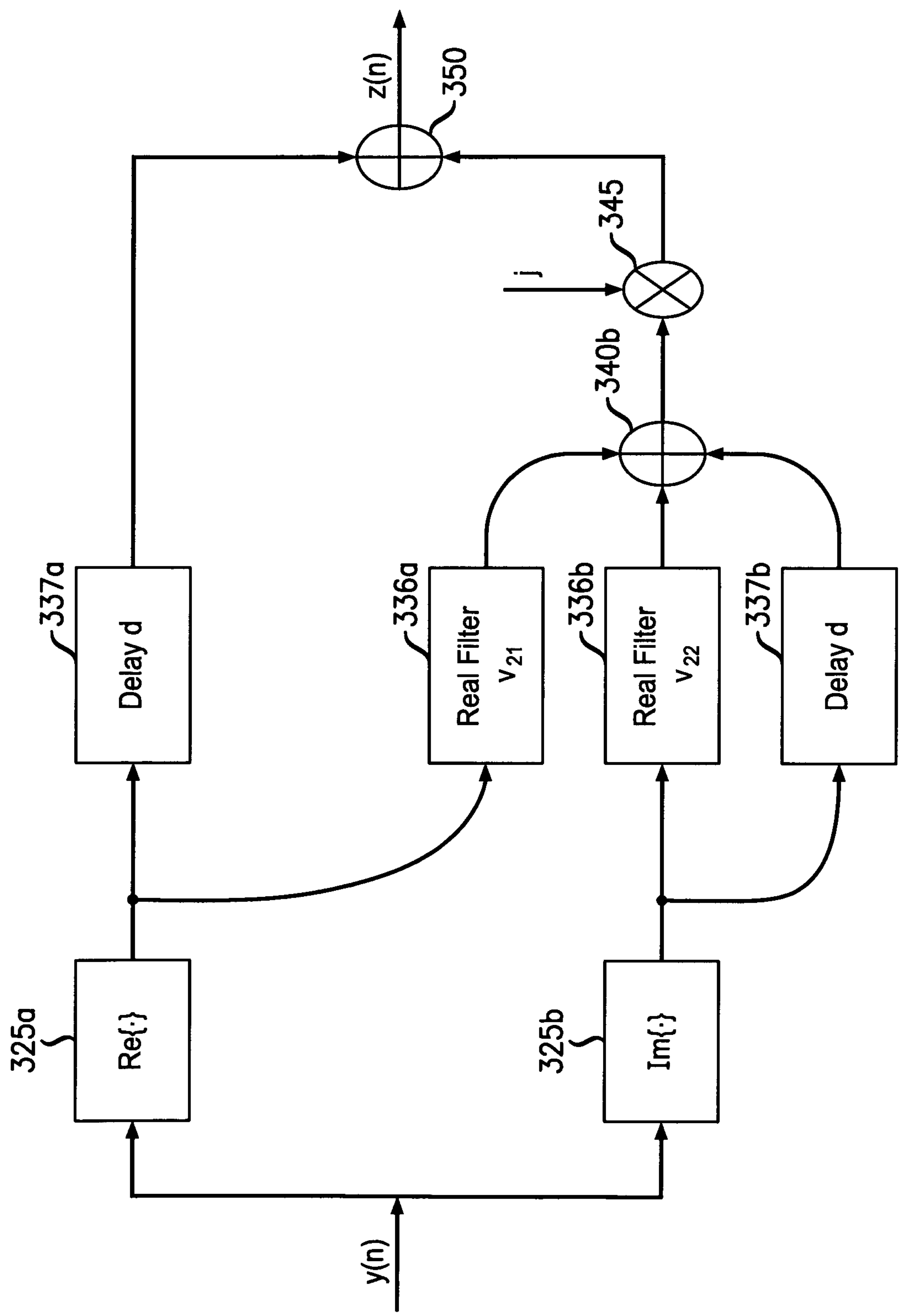

At least one example embodiment of an IQ compensator is described with regards to FIGS. 3-4B. Thus, for the sake of brevity the IQ compensator 92 will not be described in greater detail.

There are three equivalent channel models to describe IQ imbalance from x(n) to z(n). The three models are a real IQ channel model, a complex IQ channel model and a direct/image channel model.

FIGS. 2A-2D illustrate examples where a signal received at a receiver is IQ Unbalanced. However, it should be understood the channel models shown in FIGS. 2A-2D may be applicable where a signal is IQ pre-compensated before transmission.

Real IQ Channel Model

Figure 2A:
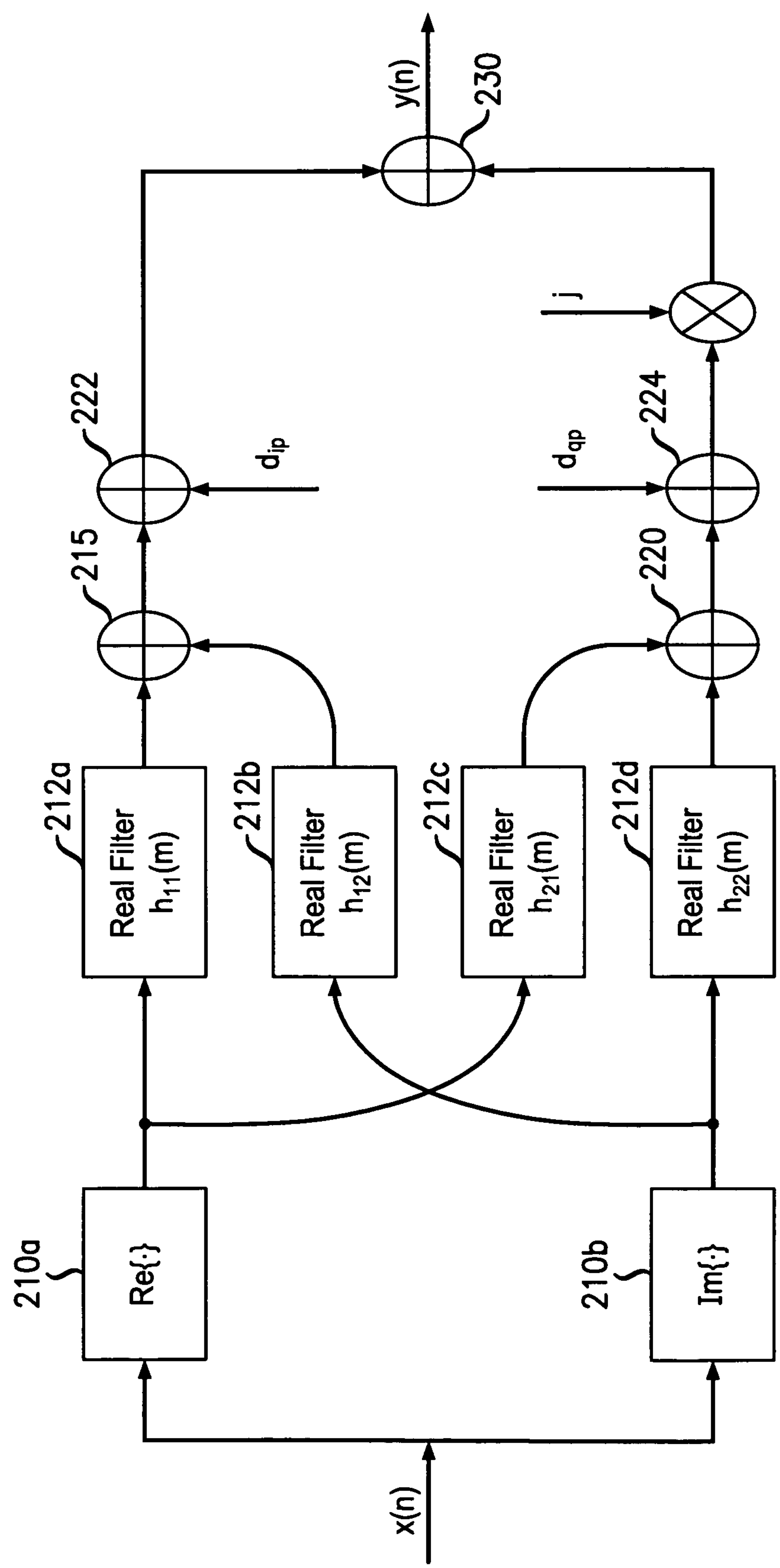
FIGS. 2A-2D illustrate channel models according to at least one example embodiment.

FIG. 2A illustrates a real IQ channel model according to an example embodiment. As shown, the sampled input signal x(n) is input to the channel. The channel includes an I channel 210*a*, which carries a real signal of the sampled input signal x(n), and a Q channel 210*b*, which carries an imaginary signal of the sampled input signal x(n). The in-phase signal is input to real filters 212*a* and 212*c* and the imaginary signal is input to the real filters 212*b* and 212D. The filters 212*a*-212*d* have weights $h_{11}(m)$, $h_{12}(m)$, $h_{21}(m)$ and $h_{22}(m)$, respectively, where m is 0, . . . , M−1, where M is the filter length. As should be understood, filter length is a number of impulse response samples in a filter.

The real filter 212*a* may be referred to as the I channel through real filter, the real filter 212*b* may be referred to as the Q to I channel cross real filter, the real filter 212*c* may be referred to as the I to Q channel cross real filter and the real filter 212*d* may be referred to as the Q channel through real filter.

As shown, outputs from the real filters 212*a* and 212*b* are summed by an adder 215 onto the I channel 210*a*. Outputs from the 212*c* and 212*d* are summed by an adder 220 onto the Q channel 210*b*.

Outputs from adders are offset by direct current (DC) offsets $d_{in}$ and $d_q$ at adders 222 and 224.

An output from the adder 224 is multiplied by j ($=\sqrt{-1}$) and then added to an output from the adder 222 by an adder 230. The adder 230 outputs sampled imbalanced training signals y(n).

Complex IQ Channel Model

Figure 2B:
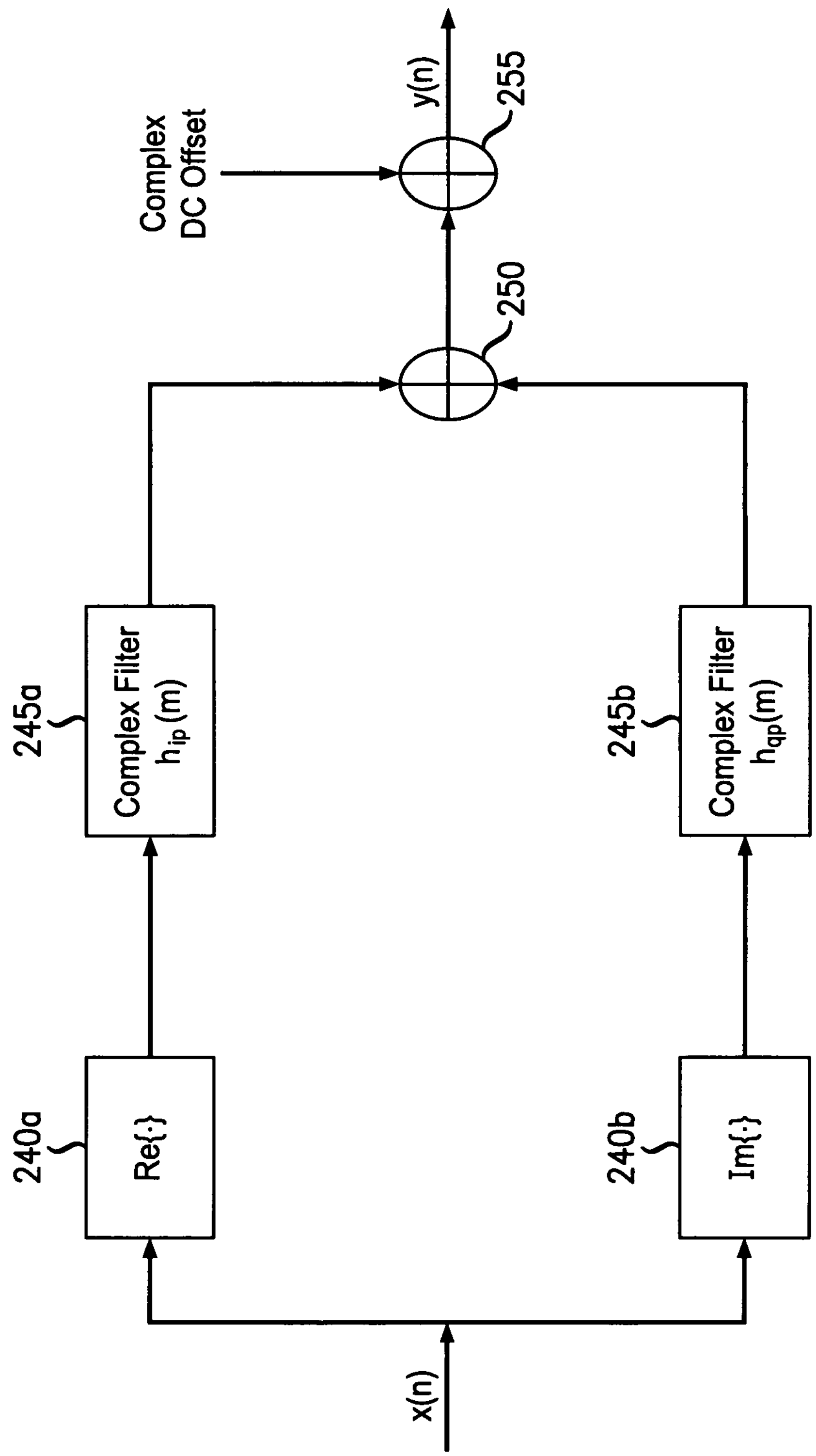

FIG. 2B illustrates a complex IQ channel model according to an example embodiment. As shown, the sampled input signal x(n) is input to the channel. The channel includes an I channel 240*a*, which carries the in-phase signal of the sampled input signal x(n), and a Q channel 240*b*, which carries the quadrature-phase signal of the sampled input signal x(n). The in-phase signal is input to a complex filter 245*a* and the quadrature-phase signal is input to a complex filter 245*b*. The complex filters 245A, 245B have weights $h_{ip}(m)$ and $h_{qp}(m)$, respectively, where $$\begin{cases} h_{ip}(m) = h_{11}(m) + jh_{21}(m) & m = 0, 1, \ldots, (M-1) \\ h_{qp}(m) = h_{12}(m) + jh_{22}(m) \end{cases} \quad (1)$$

$$\begin{bmatrix} h_{11}(m) & h_{12}(m) \\ h_{21}(m) & h_{22}(m) \end{bmatrix} = \begin{bmatrix} \mathrm{Re}\{h_{ip}(m)\} & \mathrm{Re}\{h_{qp}(m)\} \\ \mathrm{Im}\{h_{ip}(m)\} & \mathrm{Im}\{h_{qp}(m)\} \end{bmatrix}$$

An adder 250 adds the outputs from the complex filters 245*a* and 245B. An adder 255 adds an output of the adder 255 to a complex DC offset, which is complex ($d_{ip}$,$d_{qp}$).

The adder 255 outputs the sampled imbalanced training signals y(n).

Direct/Image Channel Model

Figure 2C:
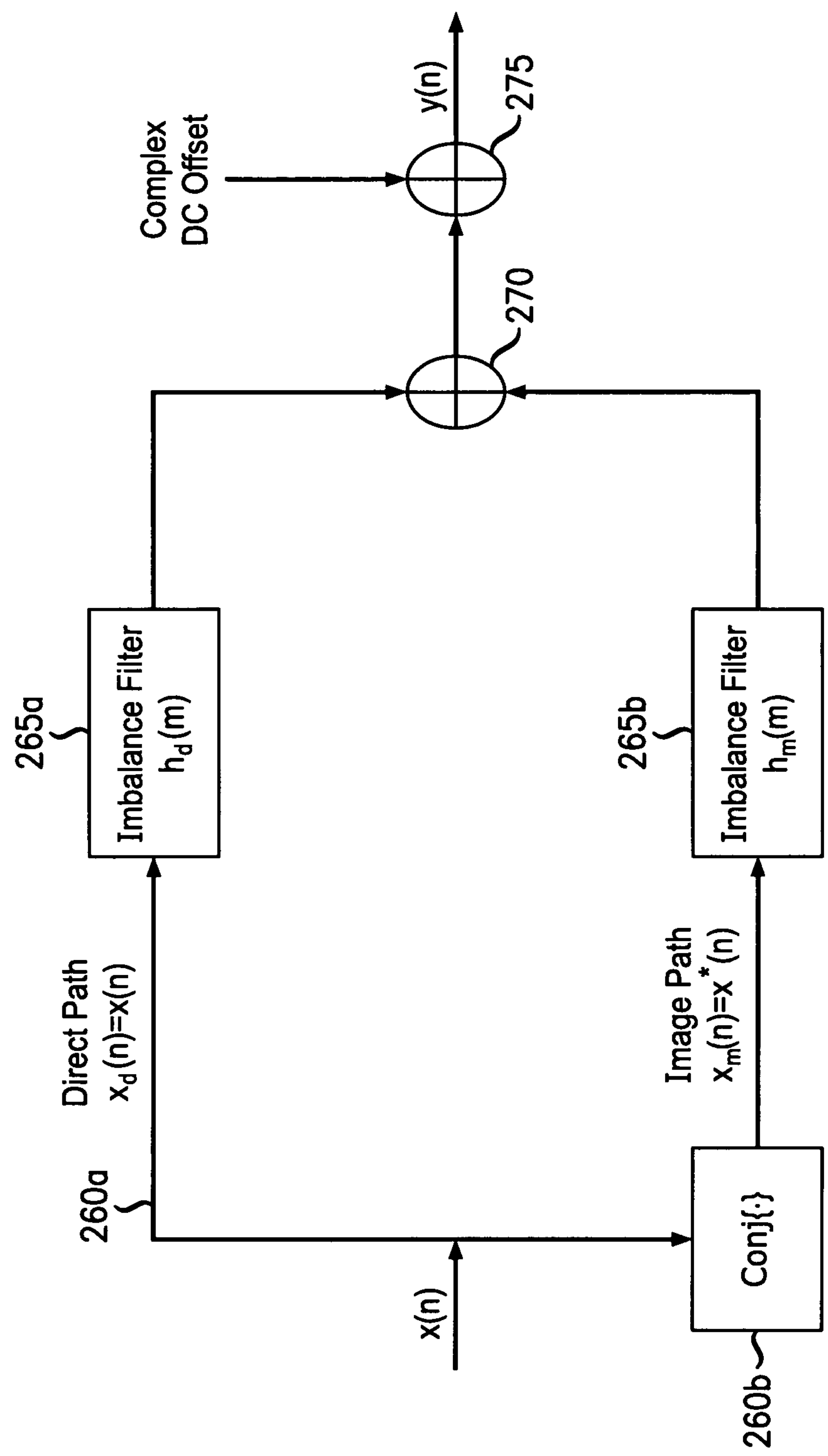

FIG. 2C illustrates a direct/image channel model. As shown, the sampled input signal x(n) is input to the channel. The channel includes a direct path 260*a*, which carries a direct-path signal $x_d(n)$ of the sampled input signal x(n), and an image path 260*b*, which carries the image-path signal $x_m(n)$ of the sampled input signal x(n). The image-path signal $x_m(n)$ is the complex conjugate of the direct-path signal $x_d(n)$. The direct-path signal $x_d(n)$ is input to an imbalance filter 265*a* and the image-path signal $x_m(n)$ is input to an imbalance filter 265*b*. The complex filters have weights $h_d(m)$ and $h_m(m)$, respectively, where $$\begin{cases} h_d(m) = (h_{ip}(m) - jh_{qp}(m))/2 = ((h_{11}(m) + h_{22}(m)) + j(h_{21}(m) - h_{12}(m)))/2 \\ h_m(m) = (h_{ip}(m) + jh_{qp}(m))/2 = ((h_{11}(m) - h_{22}(m)) + j(h_{21}(m) + h_{12}(m)))/2 \end{cases} \quad (2)$$

$$\begin{bmatrix} h_{11}(m) & h_{12}(m) \\ h_{21}(m) & h_{22}(m) \end{bmatrix} = \begin{bmatrix} \mathrm{Re}\{h_m(m) + h_d(m)\} & \mathrm{Im}\{h_m(m) - h_d(m)\} \\ \mathrm{Im}\{h_d(m) + h_m(m)\} & -\mathrm{Re}\{h_m(m) - h_d(m)\} \end{bmatrix}$$

An adder 270 adds the outputs from the imbalance filters 265*a* and 265. An adder 275 adds an output of the adder 275 to a complex DC offset.

The adder 275 outputs the sampled imbalanced training signals y(n).

Figure 2D:
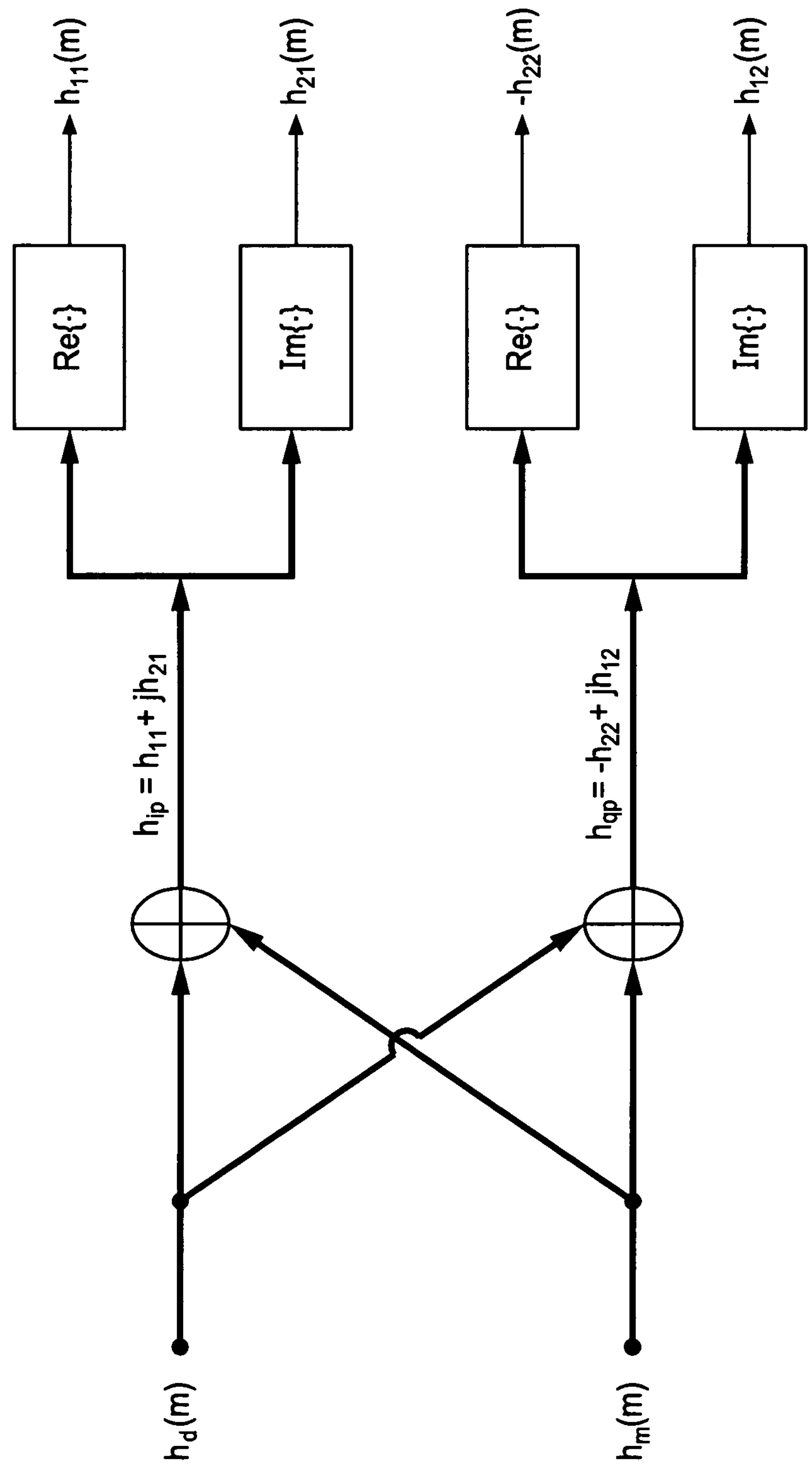

From FIGS. 2A-C, each of the filters may be converted to another filter as shown in FIG. 2D.

IQ Imbalance Compensation

FIG. 3 illustrates an IQ imbalance and compensation model according to at least one example embodiment. As shown in FIG. 3, a compensation model 310 is configured to receive the sampled imbalanced training signals y(n) output from a channel estimation model 320. The channel estimation model 320 is the direct/image channel model shown in FIG. 2C. It should be understood that the compensation model 310 may be implemented as the IQ compensator 92, shown in FIG. 1C, and may be modified to function as the IQ pre-compensator 76, shown in FIG. 1B.

The direct-path signal is the imbalanced training signal y(n) and the image-path signal is the conjugate of the imbalanced training signal, or Conj{y(n)}. While at least one example embodiment is described below with reference to direct-path and image-path signals, the algorithm is also applicable to real IQ channel model and complex IQ channel model As shown, the compensation model 310 includes a direct path 325*a* and an image path 325*b*. A compensation filter $w_d$ 330*a* is on the direct path 325*a* and receives the imbalanced training signal (direct-path signal) y(n). A compensation filter $w_m$ 330*b* is on the image path 325*b* and receives the complex conjugate of the imbalanced training signal y(n). The compensation filters 330*a* and 330*b* have weights $w_d(m)$ and $w_m(m)$, respectively.

The compensation filter weights $w_d(m)$ and $w_m(m)$ are determined by the microprocessor to compensate for the IQ imbalance of the imbalanced signal y(n), as will be described below.

As shown, the input sampled signal x(n) includes a direct-path signal $x_d(n)$ and an image-path signal $x_m(n)$, which is the complex conjugate of x(n). The Discrete Fourier Transform (DFT) for the direct-path imbalance filter 265*a* is determined by $$H_d(k)=\sum_{n=0}^{N-1}h_d(n)\cdot e^{-j2\pi kn/N} \tag{3}$$

and the image-path imbalance filter 265*b* DFT is determined by $$H_m(k)=\sum_{n=0}^{N-1}h_m(n)\cdot e^{-j2\pi kn/N} \tag{4}$$

where N is a DFT bin size, the filter length M is less than the DFT bin size N and k is from zero to N−1. The input sampled signal x(n) is analyzed to determine the DFTs of the direct-path imbalance filter 265*a* and the image-path imbalance filter 265*b*.

The continuous wave tone training signal x(t) is a complex exponential with a known frequency, but unknown amplitude and phase. The continuous wave tone training signal x(t) is not observable. For analysis purposes, the sampled training signal x(n), although still not observable, is considered where the sampling rate is, for example, at 61.44 MHz rate. In an example embodiment described below, the input sampled signal x(n) is a sampled tone signal generated by the tone generator 40.

It should be understood that a wideband signal may be used instead of the tone signal to train the filter weights. The frequency band of the wideband signal is preset so that it does not overlap with an image signal frequency band. Multiple captures of the wideband signals of different frequency bands are gathered to cover the whole frequency band of interest. In the base station 10, the tone generator 40 is programmed to generate the continuous wave tone training signal x(t) looped back to the receiver 20. Therefore, the base station 10 considers tone-trained IQ imbalance compensation.

For example, the tone generator 40 generates a tone with a frequency offset $df_i$, where i is a tone index. For example, table 1 illustrates tone index i associated with a frequency offset $df_i$, a local oscillator frequency of the tone generator and local oscillator frequency of the receiver.

TABLE 1

| Tone Index, i | Frequency Offset $df_i$ (kHz) | Tone Generator LO (kHz) | Rx LO (kHz) |
|---|---|---|---|
| 0 | −9,900 | 2,525,100 | 2,535,000 |
| 1 | −7,500 | 2,527,500 | 2,535,000 |
| 2 | −5,100 | 2,529,900 | 2,535,000 |
| 3 | −2,700 | 2,532,300 | 2,535,000 |
| 4 | −300 | 2,534,700 | 2,535,000 |
| 5 | 300 | 2,535,300 | 2,535,000 |
| 6 | 2,700 | 2,537,700 | 2,535,000 |
| 7 | 5,100 | 2,540,100 | 2,535,000 |
| 8 | 7,500 | 2,542,500 | 2,535,000 |
| 9 | 9,900 | 2,544,900 | 2,535,000 |

The Rx LO in column 5 of Table 1 is a frequency of the local oscillator in a demodulator of a receiver. For example, in FIG. 1C, the Rx LO is the frequency of the local oscillator in the demodulator 84. The frequency offset is the frequency of the continuous wave tone training signal x(t).

The direct-path input sampled signal $x_d(n)$ is $$x_d(n)=x(n)=a_i\cdot e^{j2\pi k_i n/N} \tag{5}$$

where $a_i$ is the tone initial phase and amplitude for the index i.

The tone initial phase and amplitude $a_i$ is a complex number and unknown. Index $k_i$ is the DFT bin index associated with tone index i where the angle of the sine wave at sample time n is $$2\Pi k_i n/N \tag{6}$$

The DFT for the direct-path input sampled signal is:

$$\begin{aligned} X_d(k) &= X(k) \\ &= \sum_{n=0}^{N-1} x(n)\cdot e^{-j2\pi kn/N} \\ &= a_i\sum_{n=0}^{N-1} e^{-j2\pi(k-k_i)n/N} \\ &= \begin{cases} a_i N & k=k_i \\ \approx 0 & k\neq k_i \end{cases} \end{aligned} \tag{7}$$

Similarly, the image-path input sampled signal $x_m(n)$ and DFT are $$x_m(n) = x^*(n) = a_i^* \cdot e^{-j2\pi k_i n/N} \tag{8}$$

$$\begin{aligned} X_m(k) &= \sum_{n=0}^{N-1} a_i^* \cdot e^{-j2\pi k_i n/N} \cdot e^{j2\pi k n/N} \\ &= a_i^* \sum_{n=0}^{N-1} e^{-j2\pi(k+k_i)n/N} \\ &= (X(-k))^* \\ &= \begin{cases} a_i^* N & k = -k_i \\ \approx 0 & k \neq -k_i \end{cases} \end{aligned} \tag{9}$$

The imbalanced input signal y(n) is observable and, thus, may be used by the processor 50 to estimate the imbalance and compensation filters. Based on equations (5)-(6) and (8)-(9), the DFT of the imbalanced input signal y(n) may be related to the input signals and filters. The time series and DFT values of the imbalanced input signal are, where ⊗ denotes convolution $$y(n) = h_d(n) \otimes x_d(n) + h_m(n) \otimes x_m(n) \tag{10}$$

$$\begin{aligned} Y(k) &= H_d(k)X_d(k) + H_m(k)X_m(k) \\ &= \begin{cases} a_i N H_d(k_i) & k = k_i \\ a_i^* N H_m(k_i) & k = -k_i \\ \approx 0 & \text{else} \end{cases} \end{aligned} \tag{11}$$

Equation (11) shows that the DFT Y(k) is a sum of impulses at positive and negative frequencies of the input training tone index i where the DFT bin index k is at the positive index $k_i$ and at the negative index $-k_i$.

As stated above, the initial phase and amplitude $a_i$ of the sampled input training tone signal x(n) is initially unknown. However, the initial phase and amplitude $a_i$ may be determined from the DFT of the in-phase signal or the quadrature-phase signal. For the sake of brevity, an algorithm using the DFT of the in-phase signal is described. The in-phase signal r(n) in time series and DFT are determined as follows:

$$x(n) == a_i e^{j2\pi k_i n/N} = |a_i| e^{(j\theta + j2\pi n k_i n/N)} \tag{12}$$

where $$a_i = |a_i| e^{j\theta} \tag{13}$$

thus $$r(n) = \text{Re}(x(n)) = \frac{|a_i|}{2}\left(e^{(j\theta + j2\pi n k_i n/N)} + e^{-(j\theta + j2\pi n k_i n/N)}\right) \tag{14}$$

The DFT of the in-phase signal is determined by $$\begin{aligned} R(k) &\equiv \sum_{n=0}^{N-1} r(n) \cdot e^{-j2\pi k n/N} \\ &= \sum_{n=0}^{N-1} \frac{|a_i|}{2}\left(e^{(j\theta + j2\pi n k_i n/N)} + e^{-(j\theta + j2\pi n k_i n/N)}\right) \cdot e^{-j2\pi k n/N} \\ &= \frac{|a_i|}{2} e^{j\theta} \sum_{n=0}^{N-1} e^{-j2\pi(k-k_i)n/N} + \frac{|a_i|}{2} e^{-j\theta} \sum_{n=0}^{N-1} e^{-j2\pi(k+k_i)n/N} \end{aligned} \tag{15}$$

-continued $$= \begin{cases} a_i N/2 & k = k_i \\ a_i^* N/2 & k = -k_i \\ \approx 0 & \text{else} \end{cases}$$

As shown in equation (15), the initial phase and amplitude $a_i$ is determined from the in-phase DFT value $R(k_i)$ using $$a_i N = 2R(k_i) = 2(R(-k_i))^* \tag{16}$$

Therefore, the initial phase and amplitude $a_i$ can be determined based on the in-phase DFT at the positive and negative frequencies associated the DFT bin indexes $k_i$ and $-k_i$ in equation (16).

By relating the DFT of the in-phase signal R(k) to the DFT of the observation signal Y(k), the DFTs of both the direct-path imbalance filter 265*a* and the image-path imbalance filter 265*b* can be expressed in terms of known quantities. The DFT of the in-phase signal $y_i(n)$ at the positive bin index $k_i$ is $$Y(k_i) = a_i N H_d(k_i) = 2R(k_i) H_d(k_i) \tag{17}$$

The DFT of the image signal $y_q(n)$ at the negative bin index $-k_i$ is $$Y(-k_i) = a^*_i N H_m(-k_i) = 2(R(-k_i))^* H_m(-k_i) \tag{18}$$

Expanding the filter DFT terms in equation (17), the direct-path imbalance filter weights $h_d(m)$ 265*a* satisfies the following linear equations (i=0, 1, . . . , I−1)

$$\frac{Y(k_i)}{2R(k_i)} = H_d(k_i) = \sum_{m=0}^{M-1} h_d(m) e^{-j2\pi k_i m/N} \tag{19}$$

Expanding equation (18), the image-path imbalance filter weights $h_m(m)$ 265*b* satisfies the following linear equations (i=0, 1, . . . , I−1)

$$\frac{Y(-k_i)}{2(R(-k_i))^*} = H_m(-k_i) = \sum_{m=0}^{M-1} h_m(m) e^{j2\pi k_i m/N} \tag{20}$$

The DFT values $Y(\pm k_i)$ and $R(\pm k_i)$ are determined from the observed data of the imbalanced signal y(n). The variables in the above equations (19) and (20) are the channel estimate filter weights $h_d(m)$ and $h_m(m)$.

Equation (19) is put into matrix format to determine a least-squares solution for an estimate of the direct-path imbalance filter 265*a* as follows:

$$u = e^{j2\pi/N} \tag{21}$$

$$A_d h_d = b_d \tag{22}$$

-continued $$\begin{bmatrix} 1 & u^{-k_0} & u^{-2k_0} & \dots & u^{-(M-1)k_0} \\ 1 & u^{-k_1} & u^{-2k_1} & \dots & u^{-(M-1)k_1} \\ 1 & u^{-k_2} & u^{-2k_2} & \dots & u^{-(M-1)k_2} \\ \vdots & \vdots & \vdots & \ddots & \vdots \\ 1 & u^{-k_{I-1}} & u^{-2k_{I-1}} & \dots & u^{-(M-1)k_{I-1}} \end{bmatrix} \tag{23}$$

$$\begin{bmatrix} h_d(0) \\ h_d(1) \\ h_d(2) \\ \vdots \\ h_d(M-1) \end{bmatrix} = \begin{bmatrix} Y(k_0)/2R(k_0) \\ Y(k_1)/2R(k_1) \\ Y(k_2)/2R(k_2) \\ \vdots \\ Y(k_{I-1})/2R(k_{I-1}) \end{bmatrix}$$

The least-squares solution for the direct-path imbalance filter 265*a* is $$\hat{h}_d=(A_d^H A_d)^{-1} A_d^H b_d \tag{23}$$

Equation (20) is put into matrix format to determine a least-squares solution for an estimate of the image-path imbalance compensation filter 265*b* as follows:

$$A_m h_m = b_m \tag{25}$$

$$\begin{bmatrix} 1 & u^{k_0} & u^{2k_0} & \dots & u^{(M-1)k_0} \\ 1 & u^{k_1} & u^{2k_1} & \dots & u^{(M-1)k_1} \\ 1 & u^{k_2} & u^{2k_2} & \dots & u^{(M-1)k_2} \\ \vdots & \vdots & \vdots & \ddots & \vdots \\ 1 & u^{k_{I-1}} & u^{2k_{I-1}} & \dots & u^{(M-1)k_{I-1}} \end{bmatrix} \tag{26}$$

$$\begin{bmatrix} h_m(0) \\ h_m(1) \\ h_m(2) \\ \vdots \\ h_m(M-1) \end{bmatrix} = \begin{bmatrix} Y(-k_0)/2R(k_0)^* \\ Y(-k_1)/2R(k_1)^* \\ Y(-k_2)/2R(k_2)^* \\ \vdots \\ Y(-k_{I-1})/2R(k_{I-1})^* \end{bmatrix}$$

where $$I \ge M \tag{27}$$

The least-squares solution for the image-path imbalance filter 265*b* is $$\hat{h}_m=(A_m^H A_m)^{-1} A_m^H b_m \tag{26}$$

The IQ imbalance compensation filters 330*a* and 330*b* may be determined without computing the IQ imbalance channel estimate, which is described above.

As shown in FIG. 3, the configuration of the IQ imbalance compensation has two filters: the direct-path filter $w_d(m)$ and image-path filter $w_m(m)$. N-point DFTs of the direct-path compensation filter 330*a* and the image-path compensation filter 330*b* are given by $$W_d(k) = \sum_{n=0}^{N-1} w_d(n) \cdot e^{-j2\pi kn/N} \tag{29}$$

$$W_m(k) = \sum_{n=0}^{N-1} w_m(n) \cdot e^{-j2\pi kn/N} \tag{30}$$

$$k = 0, \dots, N-1$$

The length M of the compensation filters 330*a* and 330*b* is less than the DFT bin size N.

The IQ compensated output signal z(n) is the sum of the filtered direct-path signal (output of the direct-path compensation filter 330*a*) and image-path signals (output of the image-path compensation filter 330*b*). A DFT of the output signal z(n) is expressed as follows:

$$z(n)=y_d(n)\otimes w_d(n)+y_m(n)\otimes w_m(n) \tag{31}$$

$$Z(k)=Y_d(k)W_d(k)+Y_m(k)W_m(k) \tag{32}$$

The DFT value of Z(k) may be set to the tone DFT value at the tone index and to set to zero at the image signal index, as shown in equations (33) and (34) below:

$$Z(k_i)=W_d(k_i)Y(k_i)+W_m(k_i)(Y(-k_i))^*=a_iN=2R(k_i)e^{-j2\pi k^{id/N}} \tag{33}$$

at $k=k_i$, $$Z(-k_i)=W_d(-k_i)Y(-k_i)+W_m(-k_i)(Y(k_i))^*=0 \tag{34}$$

at $k=-k_i$.

where delay d=M/2.

As described above, filter weights $w_d(m)$ and $w_m(m)$ are determined such that the original tone signal is preserved and the image signal is reduced. Thus, the right hand side of equation (33) is set to the tone initial phase and amplitude and the right hand side of equation (34) is set to equal zero.

In equation (33), the initial phase and amplitude $a_i$ is determined from the in-phase DFT value $R(k_i)$ using $$a_iN=2R(k_i)=2(R(-k_i))^* \tag{35}$$

Therefore, equations (33) and (34) are expanded as a system of equations in terms of the compensation filter weights $w_d$ and $w_m$.

$$Y(k_i)\sum_{m=0}^{M-1} w_d(m)e^{-j2\pi k_i m/N} + (Y(-k_i))*\sum_{m=0}^{M-1} w_m(m)e^{-j2\pi k_i m/N} = 2R(k_i)e^{-j2\pi k_i d/N} \tag{36}$$

$$Y(-k_i)\sum_{m=0}^{M-1} w_d(m)e^{j2\pi k_i m/N} + (Y(k_i))*\sum_{m=0}^{M-1} w_m(m)e^{j2\pi k_i m/N} = 0 \tag{37}$$

$$i=0, 1, \dots, (I-1), I \ge M$$

where delay d=integer(M/2).

Equations (36) and (37) may be written in matrix format, by defining four matrices $$A = \begin{bmatrix} Y(k_0) & Y(k_0)u^{-k_0} & \dots & Y(k_0)u^{-(M-1)k_0} \\ Y(k_1) & Y(k_1)u^{-k_1} & \dots & Y(k_1)u^{-(M-1)k_1} \\ \vdots & \vdots & \ddots & \vdots \\ Y(k_{I-1}) & Y(k_{I-1})u^{-k_{I-1}} & \dots & Y(k_{I-1})u^{-(M-1)k_{I-1}} \end{bmatrix}$$

$$B = \begin{bmatrix} (Y(-k_0))^* & (Y(-k_0))^*u^{-k_0} & \dots & (Y(-k_0))^*u^{-(M-1)k_0} \\ (Y(-k_1))^* & (Y(-k_1))^*u^{-k_1} & \dots & (Y(-k_1))^*u^{-(M-1)k_1} \\ \vdots & \vdots & \ddots & \vdots \\ (Y(-k_{I-1}))^* & (Y(-k_{I-1}))^*u^{-k_{I-1}} & \dots & (Y(-k_{I-1}))^*u^{-(M-1)k_{I-1}} \end{bmatrix}$$

-continued $$C=\begin{bmatrix} Y(-k_0) & Y(-k_0)u^{k_0} & \dots & Y(-k_0)u^{(M-1)k_0} \\ Y(-k_1) & Y(-k_1)u^{k_1} & \dots & Y(-k_1)u^{(M-1)k_1} \\ \vdots & \vdots & \ddots & \vdots \\ Y(-k_{I-1}) & Y(-k_{I-1})u^{k_{I-1}} & \dots & Y(k_{I-1})u^{(M-1)k_{I-1}} \end{bmatrix}$$

$$D=\begin{bmatrix} (Y(k_0))^* & (Y(k_0))^*u^{k_0} & \dots & (Y(k_0))^*u^{(M-1)k_0} \\ (Y(k_1))^* & (Y(k_1))^*u^{k_1} & \dots & (Y(k_1))^*u^{(M-1)k_1} \\ \vdots & \vdots & \ddots & \vdots \\ (Y(k_{I-1}))^* & (Y(k_{I-1}))^*u^{k_{I-1}} & \dots & (Y(k_{I-1}))^*u^{(M-1)k_{I-1}} \end{bmatrix}$$

Aggregating matrices A, B, C and D forms a matrix on the left hand side $$U\equiv\begin{bmatrix} A & B \\ C & D \end{bmatrix}$$

The right hand side vector is $$b=\begin{bmatrix} 2R(k_0)u^{-k_0 d} \\ 2R(k_1)u^{-k_1 d} \\ \vdots \\ 2R(k_{I-1})u^{-k_{I-1} d} \end{bmatrix}$$

I≥M where $u=e^{j2\pi/N}$ and the delay d=integer(M/2).

The variables are the compensation filter weights $w_d$ and $w_m$ $$w_d=\begin{bmatrix} w_d(0) \\ w_d(1) \\ \vdots \\ w_d(M-1) \end{bmatrix},\ w_m=\begin{bmatrix} w_m(0) \\ w_m(1) \\ \vdots \\ w_m(M-1) \end{bmatrix}$$

Consequently, the system of equations for the compensation filters 330*a* and 330*b* is $$\begin{bmatrix} A & B \\ C & D \end{bmatrix}\begin{bmatrix} w_d \\ w_m \end{bmatrix}=\begin{bmatrix} b \\ 0 \end{bmatrix} \text{ or } U\begin{bmatrix} w_d \\ w_m \end{bmatrix}=\begin{bmatrix} b \\ 0 \end{bmatrix} \quad (38)$$

The least-squares solution for the IQ imbalance compensation filter weights $w_d$ and $w_m$ is $$\begin{bmatrix} w_d \\ w_m \end{bmatrix}=(U^H U)^{-1}U^H\begin{bmatrix} b \\ 0 \end{bmatrix} \quad (39)$$

Alternatively, the matrices A, B, C and D may be determined as follows $$E=\begin{bmatrix} 1 & u^{-k_0} & \dots & u^{-(M-1)k_0} \\ 1 & u^{-k_1} & \dots & u^{-(M-1)k_1} \\ \vdots & \vdots & \ddots & \vdots \\ 1 & u^{-k_{I-1}} & \dots & u^{-(M-1)k_{I-1}} \end{bmatrix} \quad (40)$$

$$Y_d=\begin{bmatrix} Y(k_0) \\ Y(k_1) \\ \vdots \\ Y(k_{I-1}) \end{bmatrix}\ Y_m=\begin{bmatrix} Y(-k_0) \\ Y(-k_1) \\ \vdots \\ Y(-k_{I-1}) \end{bmatrix}$$

$$A=\text{diag}(Y_d)\cdot E$$

$$B=\text{diag}((Y_m)^*)\cdot E \quad (41)$$

$$C=\text{diag}(Y_m)\cdot E^* \quad (42)$$

$$D=\text{diag}((Y_d)^*)\cdot E^* \quad (43)$$

As described above, the filter compensation weights are determined are then may be used to filter received signals and reduce the IQ imbalance. For example, as shown in FIG. 1C, the IQ compensation system 92 includes a direct-path IQ compensation filter and an image-path IQ compensation filter. The weights of the direct-path IQ compensation filter and an image-path IQ compensation filter are determined using the algorithm described above with reference to FIG. 3. Consequently, the receiver 20 may receive signals transmitted from a remote device (e.g., the UE 60) and the IQ compensation system may reduce the IQ imbalance from the received signal by filtering the received signal after it is processed by the analog circuits (the modulator 84, low pass filters, 86*a*, 86*b*, operational amplifiers 88*a*, 88*b* and ADCs 90*a*, 90*b*).

FIG. 4A illustrates the compensation model 310 in more detail. A real signal is input to real filters 335*a* and 335*c* and the imaginary signal is input to the real filters 335*b* and 335*b*. The filters 335*a*-335*d* have weights $w_{11}(m)$, $w_{12}(m)$, $w_{21}(m)$ and $w_{22}(m)$, respectively where m is 0, . . . , M−1, where M is the filter length. The weights $w_{11}(m)$, $w_{12}(m)$, $w_{21}(m)$ and $w_{22}(m)$ may be converted to the weights $w_d$ and $w_m$ using the same conversion methods described with reference to FIGS. 2A-2D. Thus, for the same of brevity they will not be described.

As shown, outputs from the real filters 335*a* and 335*b* are summed by an adder 340*a* onto the direct-path 325*a*. Outputs from the 335*c* and 335*d* are summed by an adder 340*b* onto the image-path 340*b*.

An output from the adder 340*b* is multiplied by j ($=\sqrt{-1}$) by a multiplier 345 and then added to the output from the adder 340*a* by an adder 350. The adder 350 outputs a compensated output signal z(n).

To reduce implementation resources, the four real filters 335*a*-335*d* may be reduced to two real filters by rotating and adjusting a gain. Matrix rotation is used in matrix operations. It is described in http://mathworld.wolfram.com/RotationMatrix.html using a matrix that rotates the coordinate system through an angle. For example, $$w(z)=\begin{bmatrix} w_{11}(z) & w_{12}(z) \\ w_{21}(z) & w_{22}(z) \end{bmatrix},\ u(z)=\begin{bmatrix} u_I(z) \\ u_Q(z) \end{bmatrix},\ v(z)=\begin{bmatrix} v_I(z) \\ v_Q(z) \end{bmatrix}$$

where w(z) is the z-transforms of the weights of the filters 335*a*-335*d*, u(z) is the z-transform of u(n), which is an input signal to the filter matrix w. And, v(n) is the output of the filter w. Therefore, $$v(z) = w(z)u(z) \text{ or} \tag{44}$$

$$\begin{bmatrix} v_I(z) \\ v_Q(z) \end{bmatrix} = \begin{bmatrix} w_{11}(z) & w_{12}(z) \\ w_{21}(z) & w_{22}(z) \end{bmatrix} \begin{bmatrix} u_I(z) \\ u_Q(z) \end{bmatrix} \tag{45}$$

The elements of w(z) are rotated with an angle function θ(z), where $$\tan(\theta(z)) = \frac{w_{12}(z)}{w_{22}(z)} \tag{46}$$

thus, $$c(z) = \cos(\theta(z)) = \frac{w_{22}(z)}{\sqrt{w_{22}(z)^2 + w_{22}(z)^2}} \tag{47}$$

$$s(z) = \sin(\theta(z)) = \frac{w_{12}(z)}{\sqrt{w_{22}(z)^2 + w_{22}(z)^2}}$$

and, therefore, $$\begin{bmatrix} c(z) & -s(z) \\ s(z) & c(z) \end{bmatrix} \begin{bmatrix} w_{11}(z) & w_{12}(z) \\ w_{21}(z) & w_{22}(z) \end{bmatrix} = \begin{bmatrix} w'_{11}(z) & 0 \\ w'_{21}(z) & w'_{22}(z) \end{bmatrix} \tag{48}$$

since $$c(z)w_{12}(z)-s(z)w_{22}(z)=(w_{22}(z)w_{12}(z)-w_{12}(z)w_{22}(z))/\sqrt{w_{22}(z)^2+w_{22}(z)^2}=0$$

The gain normalized by $w'_{11}(z)$ with a delay d such that $$\frac{z^{-d}}{w'_{11}(z)} \begin{bmatrix} c(z) & -s(z) \\ s(z) & c(z) \end{bmatrix} \begin{bmatrix} w_{11}(z) & w_{12}(z) \\ w_{21}(z) & w_{22}(z) \end{bmatrix} = \frac{z^{-d}}{w'_{11}(z)} \begin{bmatrix} w'_{11}(z) & 0 \\ w'_{21}(z) & w'_{22}(z) \end{bmatrix} = \begin{bmatrix} z^{-d} & 0 \\ w''_{21}(z) & w''_{22}(z) \end{bmatrix} \tag{50}$$

where $$w'_{11}(z)=c(z)w_{11}(z)-s(z)w_{21}(z), w''_{21}(z)=w'_{21}(z)/w'_{11}(z), w''_{22}(z)=w'_{22}(z)/w'_{11}(z) \tag{51}$$

The delay is one half of the filter length M. Reducing equations (50) and (51) results in, $$y(z) = \frac{z^{-d}}{w'_{11}(z)} \begin{bmatrix} c(z) & -s(z) \\ s(z) & c(z) \end{bmatrix} \tag{52}$$

and $$v(z) = \begin{bmatrix} z^{-d} & 0 \\ w''_{21}(z) & w''_{22}(z) \end{bmatrix} \begin{bmatrix} u_I(z) \\ u_Q(z) \end{bmatrix} \tag{53}$$

$Z^{-d}$ is the z-transform of the unit impulse of delay d.

As shown in equation (53), v(z) utilizes two filters. By rotating and adjusting the gain, the four real filters 335*a*-335*d* are reduced to two real filters 336*a*-336*b*, shown in FIG. 4B. Furthermore, the direct-path 325*a* is the in-phase signal of the imbalanced signal y(n) delayed by a delay 337*a*.

The image-path 325*b* includes the real filters 336*a* and 336*b* and a delay 337*b*. The real filter 336*a* receives crossover from the real signal. The real filter 336*b* and the delay 337*b* receive the imaginary signal. The real filters 336*a* and 336*b* compensate for the IQ imbalance of the imbalanced signal y(n). The outputs of the real filters 336*a* and 336*b* and the delay 336*b* are summed by the adder 340*b* and then multiplied by j by the multiplier 345. The output of the multiplier 345 is added to the output of the delay 337*a* by the adder 350. The adder 350 outputs the compensated output signal z(n).

Using the models as explained above, filter weights may be determined by the microprocessor in the base station using the IQ compensation algorithm described above.

At least one example embodiment discloses an algorithm for determining a set of filter weights (and length) to reduce (cancel) the IQ imbalanced images. The algorithm includes a frequency-domain least-squares fit. Tone signals are sampled and input to an analog circuit of a demodulator or modulator and, thus, the outputted tone signals are imbalanced. Outputted tone samples for each tone signal are captured at different frequencies. The algorithm determines the DFTs (Discrete Fourier Transform) of each sampled tone signal. The filter weights are adjusted to reproduce the tone and to eliminate the image (target value of 0). The filter weights are determined based on a least-squares fit on the DFT values (frequency-domain values) of the imbalanced sampled tones.

Moreover, at least one example embodiment discloses a least-squares fit in the frequency doming. At least one example embodiment discloses two real filters instead of 4 real filters.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of compensating for in-phase and quadrature (IQ) imbalance in a base station, the method comprising:

generating input signals for an analog circuit of the base station, a plurality of IQ imbalanced training signals being outputs of the analog circuit and based on the input signals, the generating input signals includes, determining Discrete Fourier Transforms (DFT) of real signals of the input signals;

generating, at the base station, compensation filter weights based on the plurality of IQ imbalanced training signals, the generating compensation filter weights including, determining the compensation filter weights based on the plurality of imbalanced training signals in a frequency domain; and filtering based on the compensation filter weights.

2. The method of claim 1, wherein the generating input signals includes generating continuous wave tone signals as the input signals.

3. The method of claim 1, wherein the generating input signals includes generating wideband signals as the input signals.

4. The method of claim 1, the filtering includes, receiving a signal from a remote device, and filtering the signal to reduce an IQ imbalance of the signal.

5. The method of claim 4, wherein the filtering includes, outputting a compensated output signal, the compensated output signal being based on a DFT of the received signal.

6. The method of claim 5, wherein the compensated output signal is two times the DFT of the real signal of the received signal.

7. A method of compensating for in-phase and quadrature (IQ) imbalance in a base station, the method comprising:

generating, at the base station, compensation filter weights based on the plurality of IQ imbalanced training signals, the generating compensation filter weights including, determining the compensation filter weights based on the plurality of imbalanced training signals in a frequency domain, the determining the compensation filter weights includes, determining DFTs of the IQ imbalanced training signals; and filtering based on the compensation filter weights.

8. The method of claim 7, wherein the determining the compensation filter weights includes, determining the compensation filter weights based on a least-squares fit of the DFTs of the IQ imbalanced training signals.

9. The method of claim 7, wherein, each IQ imbalanced training signal has a direct-path signal and an image signal, the determining the DFTs of the IQ imbalance training signals includes, determining the DFTs of the direct-path signals and image-path signals of the IQ imbalanced training signals.

10. The method of claim 9, further comprising:

filtering at least one of the plurality of IQ imbalanced signals using the compensation, filter weights.

11. The method of claim 10, wherein the filtering includes, digitally filtering at least one of the plurality of IQ imbalanced signals using the compensation filter weights.

12. A user equipment (UE) configured to receive a compensated signal from a base station, the signal being compensated based on Discrete Fourier Transforms of real signals of input signals for an analog circuit of the base station, a plurality of IQ imbalanced training signals being outputs of the analog circuit, the signal being compensated being further based on the plurality of IQ imbalanced training signals and compensation filter weights based on the plurality of imbalanced training signals in a frequency domain.

* * * * *